June 5, 1923.
C. A. MASSOLL
Re. 15,619
LATCH
Original Filed May 8, 1918
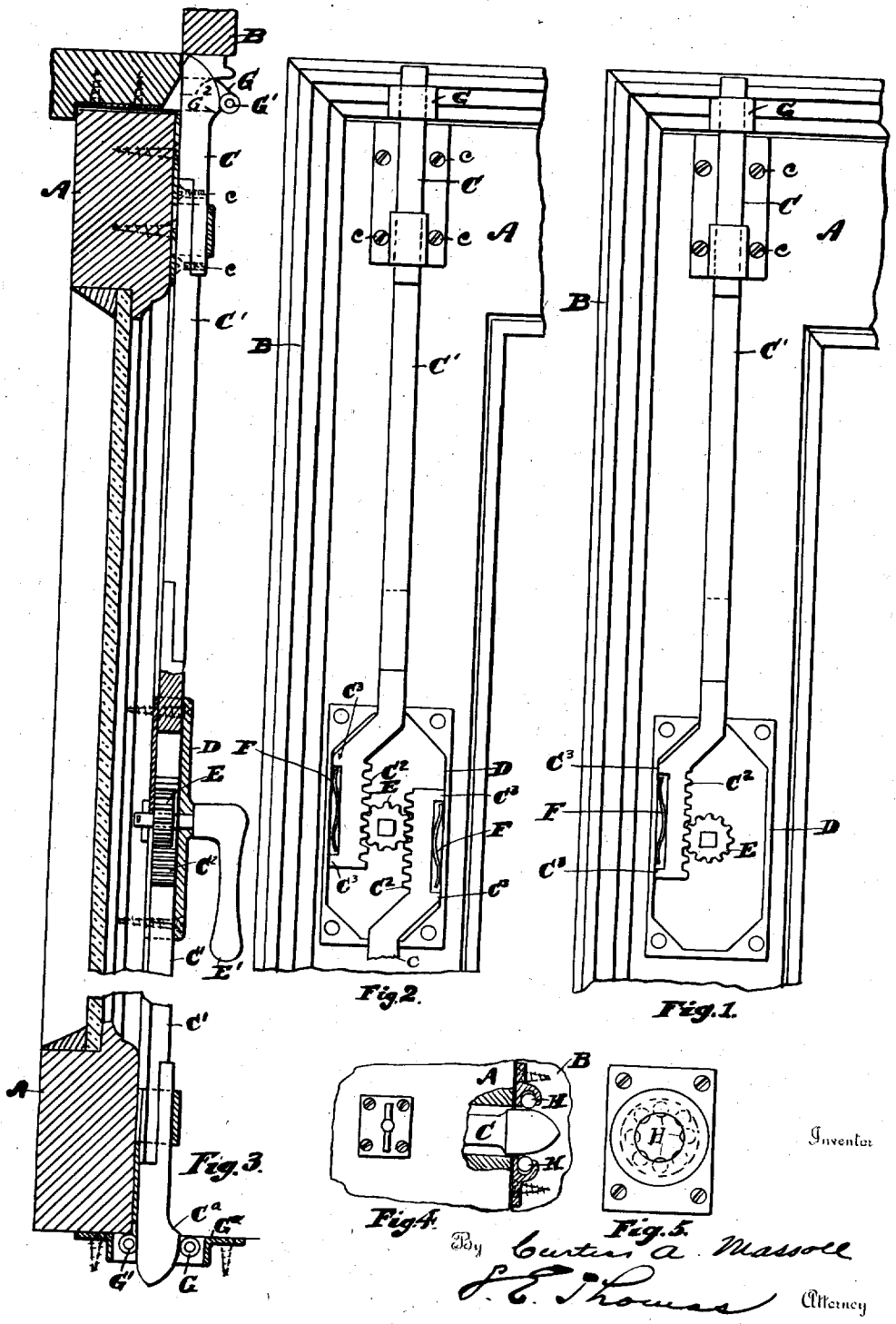
Inventor
By Curtis A. Massoll
F. E. Thomas
Attorney Reissued June 5, 1923. Re. 15,619

UNITED STATES PATENT OFFICE.

CURTIS A. MASSOLL, OF DETROIT, MICHIGAN, ASSIGNOR TO JOHN A. WHITTAKER, OF DETROIT, MICHIGAN.

LATCH.

Original No. 1,338,689, dated May 4, 1920, Serial No. 333,246, filed May 8, 1918. Application for reissue filed March 23, 1921. Serial No. 454,934.

*To all whom it may concern:*

Be it known that I, CURTIS A. MASSOLL, citizen of the United States, residing at Detroit, county of Wayne, and State of Michigan, have invented a certain new and useful Improvement in Latches, and declare the following to be a full, clear, and exact description of the same, such as will enable others skilled in the art to which it pertains to make and use the same, reference being had to the accompanying drawings, which form a part of this specification.

My invention relates to latches for use upon so-called French doors, or upon casement windows, shown in the accompanying drawings and more particularly described in the following specification and claims.

It is well known that doors of the above type,—constructed as they are almost entirely of glass, mounted in a comparatively narrow supporting frame,—are apt to become warped or bent, making it difficult to properly close the door when required. It is therefore one of the objects of this invention to provide a latch or locking means adapted when manually operated to force the door into the desired position,—or against the rabbeted edge of the casing in which it is hung, whereby if in warped or bent condition it may be straightened to provide a proper closure.

It is also well known that doors frequently sag after hanging to such an extent that the latch bolt will not register with the latch receiving plate, making it necessary to change the position of the latter that it may again register with the bolt. Therefore a further object of the invention is to insure the bolt registering with the latch plate even though these parts may not be in the same relation to each other as when originally installed.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings:

Figure 1 is a fragmentary front elevation of a door and its casing, showing the latch in position, with parts removed to disclose the bolt operating mechanism.

Figure 2 is a similar view of a modification employing an upwardly and a downwardly directed bolt, actuated by a single operating lever.

Figure 3 is a longitudinal sectional view at right angles to Figure 2 with parts broken away, showing the double wedge-shaped end of the floor engaging bolt.

Figure 4 is another modification, showing a mortise latch bolt having a tapering end to enter the bolt receiving plate.

Figure 5 is an elevation of the bolt receiving plate shown in the preceding figure, provided with anti-friction rolls or balls, arranged in an annular form for the entry of the bolt.

Referring now to the letters of reference placed upon the drawings:

A, denotes a door frame, B, the door casing. C, indicates a locking bolt, secured by screws *c*, *c*, to the operating rod C′, in turn connected with the rack bar $C^2$, housed within the enclosing case D,—the latter being secured to the stile or side pieces of the door.

E, denotes a pinion in mesh with the rack bar $C^2$, adapted to be manually actuated by an operating lever E′. The rack bar $C^2$, is recessed on its opposite side to receive a spring F, which serves the dual purpose of keeping the teeth of the rack bar in mesh with the pinion, and providing a yieldable drag upon the side wall of the enclosing case D, to insure against the accidental rotation of the pinion due to the weight of the bar. $C^3$, $C^3$, are lugs projecting from the bar toward the side wall of the case to prevent the bar from tilting at its lower end. The bolt C, is of an arc-shaped wedge form designed to enter a keeper G, secured to the door frame provided with an anti-friction roll G′, against which the inclined or wedge-shaped end of the bolt is designed to bear upon entering the keeper, that the door may be forced into the designed position,—or into abutting contact with the rabbeted edge of the door casing, whereby any bent or warped condition of the door may be corrected. The end of the bolt may be of maximum width for a short distance as indicated at $G^2$, so that if the door should sag, the action of the tapering end of the bolt would still be fully effective to force the door upon closing to a desired position. The extension of maximum width forms an enlarged or elongated head of greater thickness than the body of the bolt and the keepers are adapted to permit this extended movement of the bolts to force the door when sagging or otherwise, inwardly to the full extent of the tapered or wedge-shaped portion of the bolts so that the sagging of the door will have no effect on the closing action of the tapered or wedge-shaped portions of the bolts. The enlarged elongated heads of the bolts form projecting lugs or portions at the vertical faces as clearly shown in Figure 3 of the drawings.

When employed upon double-swinging doors, or upon doors not designed to close against a stile or rabbeted casing, double wedge-shaped bolts $C^2$, as shown in Figure 3 may be employed;—the bolts entering a keeper $G^2$, provided with two anti-friction rolls $G^4$, $G^4$, spaced apart to receive them. It will be apparent that doors not designed to close against a rabbeted casing may be thus securely held, and if bent or warped may be forced to a predetermined position through the action of the double wedge-shaped bolts when manually forced into their respective keepers.

In the modification shown in Figures 4 and 5 the latch bolt is of the mortise type, its tapering end entering a bolt receiving plate preferably provided with an annular ring comprising anti-friction rolls or balls H.

It will be readily understood that the sagging of a door fitted with the ordinary form of latch bolt would throw the end of the bolt out of register with the hole in its receiving plate and thus prevent the operation of the bolt to lock the door. The tapering end of the bolt in the present invention, however, insures its operation even though the bolt and its receiving plate may not be in the same relation to each other as when originally installed.

It will be obvious that in place of a relatively short head at the tapering end of the bolt—as shown in the drawings—the face of the bolt over which the keepers ride after leaving the tapering end may be on a uniform plane throughout.

It will also be apparent that if the installation does not require the employment of two simultaneously actuated bolts, one of the bolts may be eliminated.

Having thus described my invention what I claim is:

1. In a device of the class described, keepers located at the top and bottom of the frame work and provided at the outer sides with bolt engaging means, a vertically movable bolt carried by the door and provided with a tapering end presenting an inclined face to the bolt engaging means of the keepers for forcing the door inwardly to its closed position, said bolt having a face parallel with the side of the door extending from the tapered portion and slidable over the bolt engaging means as the door is forced inwardly by the inclined end of the bolt, before the bolt has reached its limit of motion, the bolt engaging means of the keeper being arranged to permit an extended movement of the bolt whereby any sagging of the door will be prevented from diminishing the effectiveness of the tapered end of the bolt when forcing the door tightly to its closed position, and manually operated means for actuating said bolt.

2. In a device of the class described, keepers located at the top and bottom of the frame work and provided at the outer sides with bolt engaging means vertically movable bolts carried by the door and provided with tapering ends presenting inclined faces to the bolt engaging means of the keepers for forcing the door inwardly to its closed position, said bolts having a face parallel with the side of the door extending from the tapered portion and slidable over the bolt engaging means as the door is forced inwardly by the inclined ends of the bolts before the bolts have reached their limit of motion, the bolt engaging means of the keepers being arranged to permit an extended movement of the bolts whereby any sagging of the door will be prevented from diminishing the effectiveness of the tapered ends of the bolts when forcing the door tightly to its closed position, and manually operated means for simultaneously actuating said bolts in opposite directions.

3. In a device of the class described, keepers located at the top and bottom of a door casing and provided at the outer sides with bolt engaging means, vertically movable bolts mounted on the door and provided at their outer ends with tapering heads presenting inclined outer faces to the bolt engaging means of the keepers for forcing the door inwardly to its closed position, said heads having inclined faces with vertical faces extending from said tapering portions and slidable over the bolt engaging means as the door has been forced inwardly by the said inclined faces of the bolts, the vertical faces being of sufficient length to contact with the bolt engaging means of the keeper before the bolts are entirely extended, the bolt engaging means of the keepers being arranged to permit an extended movement of the bolts whereby any sagging of the door will be prevented from diminishing the effectiveness of the tapered portions of the heads of the bolts in forcing the door tightly to its closed position.

4. In a device of the class described, keepers located at the top and bottom of a door casing and provided at the outer sides with bolt engaging means, vertically movable bolts mounted on the door and provided at their outer ends with tapering heads presenting inclined outer faces to the bolt engaging means of the keepers for forcing the door inwardly to its closed position, said heads being of greater width than the body portion of the bolts and forming projecting lugs and provided at the inner ends of the inclined faces with vertical faces extending from the said tapered portions and slidable over the bolt engaging means as the door has been forced inwardly by the said inclined faces of the bolts, the bolt engaging means of the keepers being arranged to permit an extended movement of the bolts whereby any sagging of the door will be prevented from diminishing the effectiveness of the tapered portions of the heads of the bolts in forcing the door tightly to its closed position.

In testimony whereof, I sign this specification in the presence of two witnesses.

CURTIS A. MASSOLL.

Witnesses:

S. E. THOMAS,

MAURICE WOLF.